(12) United States Patent
Uchida (10) Patent No.: US 7,263,539 B2
(45) Date of Patent: Aug. 28, 2007

(54) CIRCUIT AND METHOD FOR GENERATING FIXED POINT DATA WITH REDUCED CIRCUIT SCALE

(75) Inventor: Kenji Uchida, Tokyo (JP)

(73) Assignee: NEC Electronics Corporation, Kawasaki (JP)

( * ) Notice: Subject to any disclaimer, the term of this patent is extended or adjusted under 35 U.S.C. 154(b) by 497 days.

(21) Appl. No.: 09/986,748

(22) Filed: Nov. 9, 2001

(65) Prior Publication Data

US 2002/0059354 A1    May 16, 2002

(30) Foreign Application Priority Data

Nov. 13, 2000    (JP) ............................. 2000-345317

(51) Int. Cl.
*G06F 7/00* (2006.01)
*H03M 13/03* (2006.01)

(52) U.S. Cl. ...................... 708/204; 714/795

(58) Field of Classification Search ................ 708/204, 708/209, 205, 495, 501, 505; 714/795
See application file for complete search history.

(56) References Cited

U.S. PATENT DOCUMENTS

| 5,021,986 | A | * | 6/1991 | Nakamura ................... 708/505 |
| 5,359,548 | A | * | 10/1994 | Yoshizawa et al. .......... 708/505 |
| 5,619,198 | A | * | 4/1997 | Blackham et al. ............. 341/50 |
| 5,901,076 | A |   | 5/1999 | Lynch |
| 6,070,263 | A |   | 5/2000 | Tsui et al. |

FOREIGN PATENT DOCUMENTS

| JP | 61-26135 | 2/1986 |
| JP | 61-210426 | 9/1986 |
| JP | 01-207823 | 8/1989 |
| JP | 5-274116 | 10/1993 |
| JP | 7-84755 | 3/1995 |
| JP | 07-199996 | 8/1995 |
| JP | 08-101919 | 4/1996 |
| JP | 2509279 | 4/1996 |
| JP | 2884057 | 2/1999 |

OTHER PUBLICATIONS

British Search Report dated May 22, 2002.

\* cited by examiner

*Primary Examiner*—Chuong D. Ngo
(74) *Attorney, Agent, or Firm*—McGinn IP Law Group, PLLC (57) ABSTRACT

A decoding rate is improved while reducing a circuit scale, in a fixed point data generating circuit. When a plurality of floating point data are inputted, for example, the maximum floating point data is detected as a reference data among the plurality of floating point data, in a MAX value detecting circuit 10. Then, in an exponent part subtractor 20, differences are obtained between the values of exponent parts of the plurality of inputted floating point data and the value of an exponent part of the maximum floating point data. Thereafter, in the shift register 30, mantissa parts of the inputted floating point data are shifted by the differences obtained in the exponent part subtractor 20, and, in a bit extracting portion 40, a predetermined number of bits of the shifted mantissa parts are extracted as fixed point data to be inputted to a Viterbi decoder.

18 Claims, 8 Drawing Sheets

PRIOR ART

FIG. 10

PRIOR ART

CIRCUIT AND METHOD FOR GENERATING FIXED POINT DATA WITH REDUCED CIRCUIT SCALE

FIELD OF THE INVENTION

The present invention relates generally to a circuit and method for generating fixed point data from floating point data with reduced circuit scale. More particularly, the present invention relates to a circuit and method for generating fixed point data to be inputted to a Viterbi decoder in Wide-Band Code Division Multiple Access (hereafter, referred to as WCDMA) system, from floating point data.

BACKGROUND OF THE INVENTION

Figure 9:
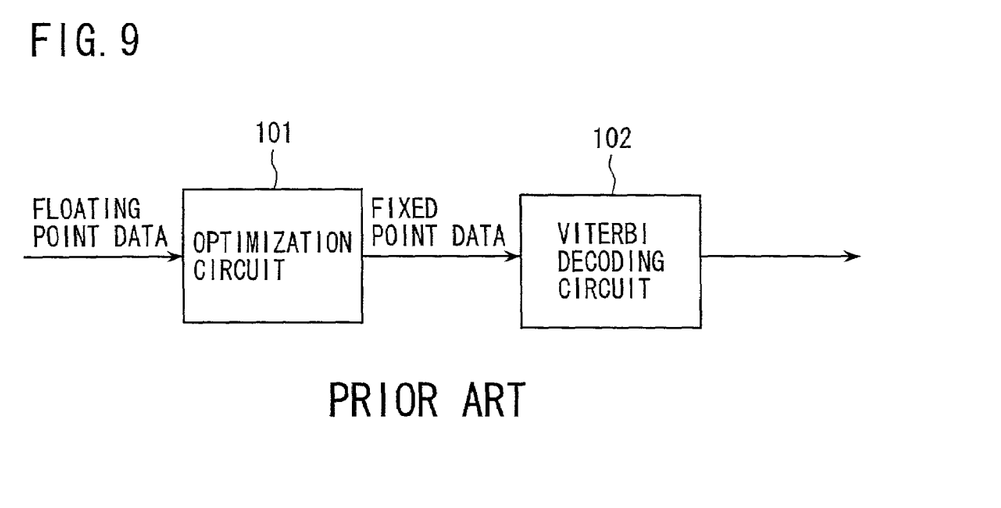
FIG. 9 is a schematic block diagram showing an example of a conventional circuit which produces fixed point data from floating point data and performs Viterbi decoding.
Figure 10:
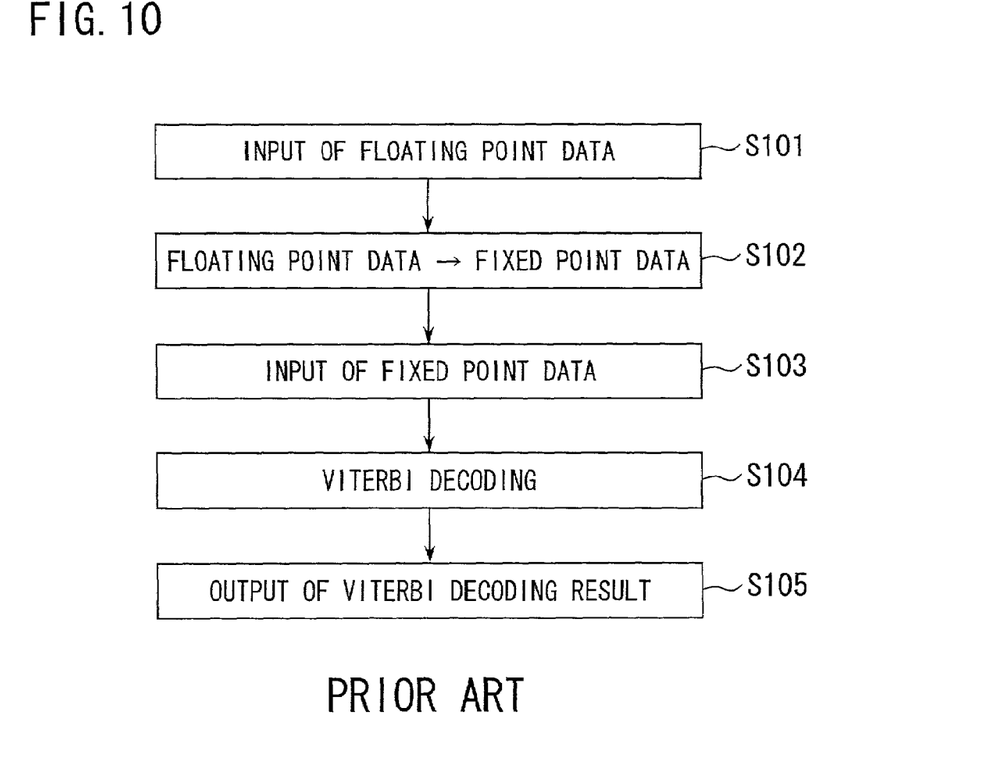
FIG. 10 is a flow chart for explaining a method of producing fixed point data from floating point data and performing Viterbi decoding by using the circuit shown in FIG. 9.

FIG. 9 is a schematic block diagram showing an example of a conventional circuit which produces fixed point data from floating point data and performs Viterbi decoding. The circuit of FIG. 9 includes an optimizing circuit 101 and a Viterbi decoder or Viterbi decoding circuit 102. FIG. 10 is a flow chart used for explaining a method of producing fixed point data from floating point data and performing Viterbi decoding, by using the circuit shown in FIG. 9.

In the conventional example shown in FIG. 9 and FIG. 10, floating point data is inputted to the optimizing circuit 101 (step S101), and the inputted floating point data is first converted into fixed point data by using the following formula (step S102), in the optimizing circuit 101.

$$(\text{input data}/\text{MAX data}) \times 2^{(\textit{Viterbi input bit width}-1)} \quad (1)$$

where "MAX data" is the maximum data among the inputted floating point data.

The fixed point data converted by the above formula is inputted into the Viterbi decoding circuit 102 (step S103), and, in the Viterbi decoding circuit 102, Viterbi decoding is performed by using the inputted fixed point data (step S104).

Thereafter, the result of Viterbi decoding obtained in step S104 is outputted from the Viterbi decoding circuit 102 (step S105).

However, in the above-mentioned conventional circuit, it is necessary to provide a division circuit for performing division process in the optimizing circuit which produces the fixed point data from the inputted floating point data. Therefore, there is a problem that a circuit scale of the fixed point data generating circuit becomes large.

Also, there is another problem that, since the bit width of Viterbi input data is fixed, it is only possible to improve Viterbi decoding rate within the decoding precision corresponding to the fixed bit width.

SUMMARY OF THE INVENTION (Object of the Invention)

Considering the above-mentioned problems of the conventional technology, the present invention has been thought out.

It is an object of the present invention to provide a circuit and method of generating fixed point data from floating point data in which a circuit scale can be reduced.

It is another object of the present invention to provide a circuit and method of generating fixed point data from floating point data in which the bit decoding rate can be improved.

It is still another object of the present invention to provide a circuit and method of generating fixed point data from floating point data in which the bit decoding rate can be improved while reducing a circuit scale.

It is still another object of the present invention to obviate the disadvantages of the conventional circuit and method of generating fixed point data from floating point data.

(Constitution)

According to an aspect of the present invention, there is provided a fixed point data generating circuit which receives a plurality of floating point data and which converts the plurality of floating point data into respective fixed point data, the fixed point data generating circuit comprising: a reference data determining means which determines a reference floating point data from the plurality of floating point data; an exponent part subtractor means which obtains a difference between each of values of exponent parts of the plurality of inputted floating point data and a value of an exponent part of the reference floating point data; a shifting means which shifts a mantissa part of each of the floating point data by the difference obtained by the exponent part subtracting means; and a bit extracting means which extracts a predetermined number of bits of the mantissa part shifted by the shifting means as fixed point data.

In this case, it is preferable that the reference data determining means is a maximum value detecting means which detects the maximum value among the plurality of floating point data and the reference floating point data is the maximum data among the plurality of floating point data.

It is also preferable that the reference data determining means is a minimum value detecting means which detects the minimum value among the plurality of floating point data and the reference floating point data is the minimum data among the plurality of floating point data.

It is further preferable that the reference data determining means is an average value calculating means which calculates an average value of the floating point data and the reference floating point data is the average data of the plurality of floating point data.

It is advantageous that the bit extracting means extracts bits as the fixed point data from a predetermined location.

It is also advantageous that, when an overflow occurs in the bits extracted by the bit extracting means as the fixed point data, the bits extracted are caused to represent the maximum value thereby.

It is further advantageous that, when an overflow occurs by shifting a mantissa part of each of the floating point data by the shifting means, shifted bits are caused to represent the maximum value thereby.

It is preferable that the fixed point data extracted by the bit extracting means is inputted to a Viterbi decoder.

It is also preferable that location of bits extracted by the bit extracting means as the fixed point data is previously determined to be location having high decoding rate.

According to another aspect of the present invention, there is provided a method for generating fixed point data in which a plurality of floating point data are converted into respective fixed point data, the method comprising: determining a reference floating point data from the plurality of floating point data; obtaining a difference between each of values of exponent parts of the plurality of inputted floating point data and a value of an exponent part of the reference floating point data; shifting a mantissa part of each of the floating point data by the difference between each of values of exponent parts of the plurality of inputted floating point data and a value of an exponent part of the reference floating point data; and extracting a predetermined number of bits from the mantissa part shifted by the difference as fixed point data.

In this case, it is preferable that the reference floating point data is the maximum data among the plurality of floating point data.

It is also preferable that the reference floating point data is the minimum data among the plurality of floating point data.

It is further preferable that the reference floating point data is the average data of the plurality of floating point data.

It is advantageous that, in the extracting a predetermined number of bits from the mantissa part shifted by the difference as the fixed point data, the bits are extracted from a predetermined location.

It is also advantageous that, in the operation of extracting a predetermined number of bits from the mantissa part shifted by the difference as the fixed point data, when an overflow occurs in the extracted bits, the extracted bits are caused to represent the maximum value thereby.

It is further advantageous that, in the operation of shifting a mantissa part of each of the floating point data by the difference, when an overflow occurs by shifting a mantissa part of each of the floating point data, shifted bits are caused to represent the maximum value thereby.

It is preferable that the fixed point data extracted in the operation of extracting a predetermined number of bits from the mantissa part shifted by the difference is inputted to a Viterbi decoder.

It is also preferable that location of bits extracted in the operation of extracting a predetermined number of bits from the mantissa part shifted by the difference is previously determined to be location having high decoding rate.

(Operation)

In the floating point data generating circuit according to the present invention which is constituted as mentioned above, when a plurality of floating point data are inputted thereto, a reference data such as the maximum or minimum floating point data is first detected from among the plurality of floating point data. A difference is obtained between the value of an exponent part of each of the inputted plurality of floating point data and the value of an exponent part of the maximum or minimum floating point data. Thereafter, a mantissa portion of each of the inputted floating point data is shifted by the amount of the difference, and a predetermined number of bits of the shifted mantissa are extracted as the fixed point data.

In this way, according to the present invention, fixed point data are produced from floating point data, only by comparison and subtraction process of the inputted floating point data. Therefore, a circuit scale does not become large.

Also, it is possible to use an average value of the inputted plurality of floating point data as a reference data. In this case, a difference is obtained between the value of an exponent part of the average value and the value of an exponent part of each of the inputted plurality of floating point data, the mantissa part of each of the floating point data is shifted by the amount of the difference, and a predetermined number of bits among the shifted mantissa can be extracted as the fixed point data.

Further, in case location of bits extracted as the fixed point data is previously determined to be location having high decoding rate, it is possible to improve the decoding rate.

BRIEF DESCRIPTION OF THE DRAWINGS

These and other features, and advantages, of the present invention will be more clearly understood from the following detailed description taken in conjunction with the accompanying drawings, in which like reference numerals designate identical or corresponding parts throughout the figures, and in which.

DESCRIPTION OF A PREFERRED
EMBODIMENT

Hereafter, embodiments of the present invention will be described with reference to the drawings.

First Embodiment

Figure 1:
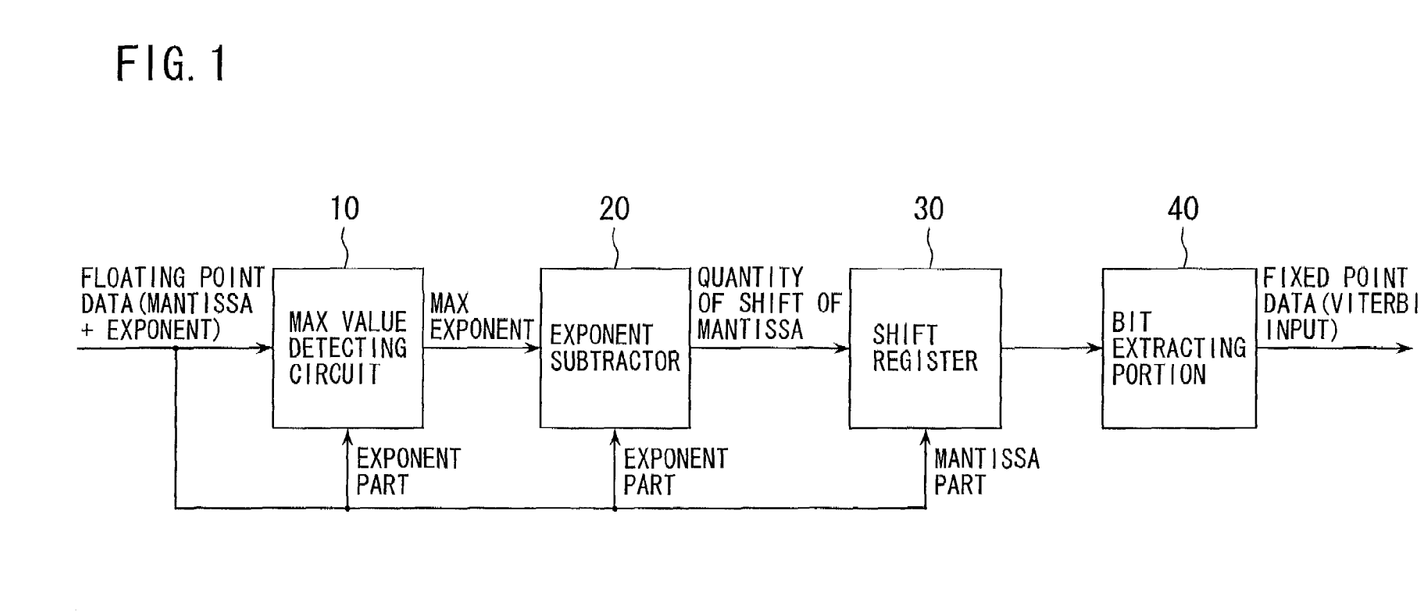
FIG. 1 is a schematic block diagram showing a fixed point data generating circuit according a first embodiment of the present invention.

FIG. 1 is a schematic block circuit diagram showing a fixed point data generating circuit according to a first embodiment of the present invention.

As shown in FIG. 1, the fixed point data generating circuit according to the first embodiment of the present invention comprises: a MAX (i.e., maximum) value detecting circuit 10 which detects the maximum floating point data as a reference data among inputted floating point data which are inputted to the MAX value detecting circuit 10; an exponent part subtractor 20 which subtracts the value of an exponent part of each of the inputted floating point data from the value of an exponent part of the floating point data which is detected as the maximum value at the MAX value detecting circuit 10; a shift register 30 which shifts the value of a mantissa part of each of the inputted floating point data based on the result of subtraction at the exponent part subtractor 20; and a bit extracting portion 40 which extracts, from the mantissa part shifted by the shift register 30, a predetermined number of bits as the fixed point data to be inputted to a Viterbi decoding circuit (not shown in the drawing).

With reference to a flow chart, an explanation will be made on a method of generating the fixed point data in the fixed point data generating circuit which is constituted as mentioned above.

Figure 2:
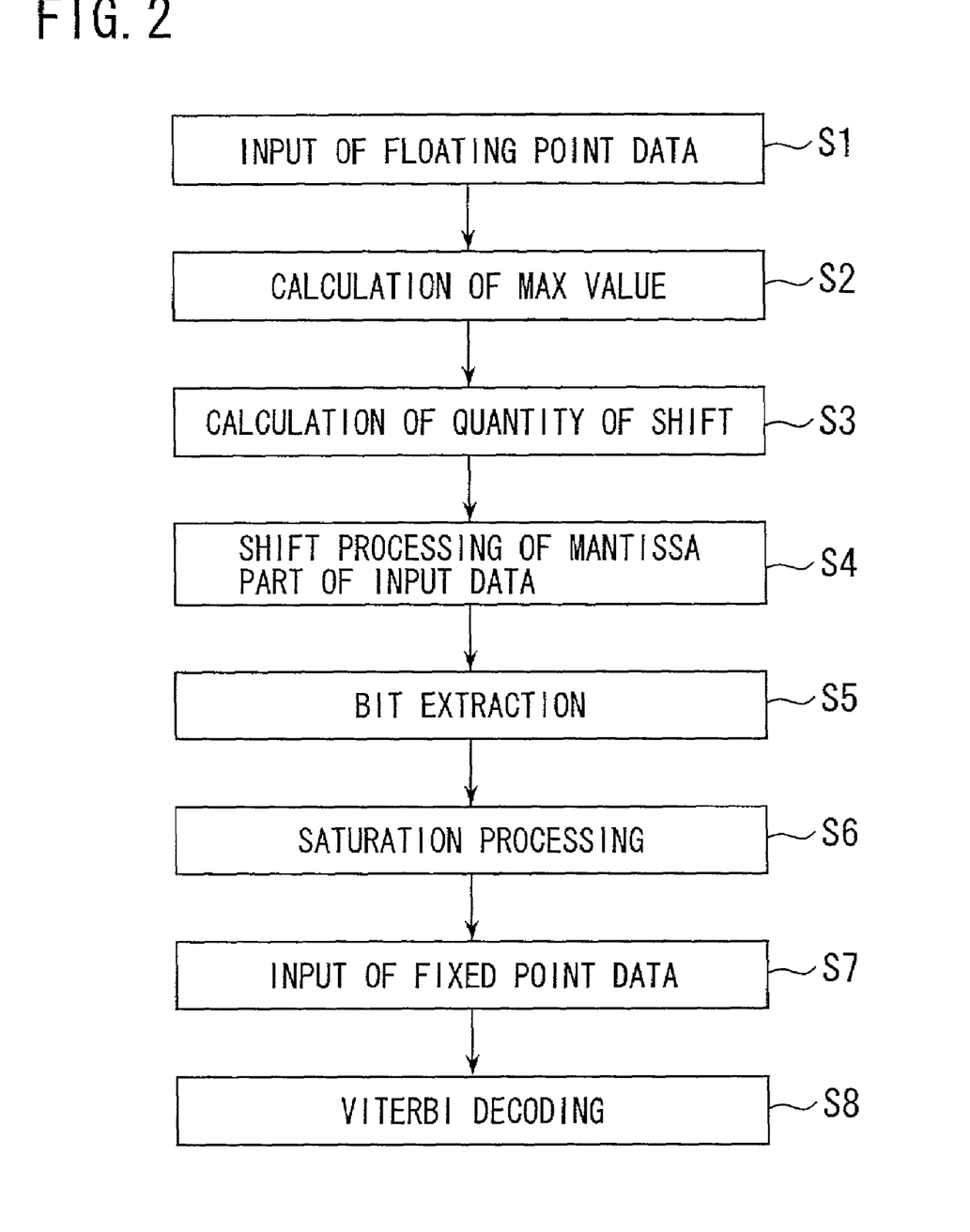
FIG. 2 is a flow chart used for explaining a method of generating fixed point data from floating point data, in the fixed point data generating circuit shown in FIG. 1.

FIG. 2 is the flow chart used for explaining the method of generating the fixed point data from inputted floating point data, in the fixed point data generating circuit shown in FIG. 1.

Floating point data are inputted to the circuit of FIG. 1 (step S1), and, first, in the MAX value detecting circuit 10, the maximum floating point data $D_{max}$ is detected among the inputted floating point data D1, D2, D3, . . . , Dn as follows (step S2).

$$D_{max}=\max\{D1, D2, D3, \ldots, Dn\} \text{ (n: amount of data)} \quad (1)$$

$$(D_{max}=D_{maxM(mantissa)}\times 2^{DmaxE(exponent)}) \quad (2)$$

Next, in order to adjust the exponent part of each of the inputted floating point data to the maximum value, the value of the exponent part of each of the inputted floating point data is subtracted from the value of the exponent part of the floating point data detected as the maximum value at the MAX value detecting circuit 10, at the exponent part subtractor 20, and outputted as a quantity of shift (step S3).

$$\text{Quantity of shift}=D_{maxE}-D_{inE} \quad (3)$$

($D_{maxE}$: maximum exponent value, $D_{inE}$: exponent value of inputted floating point data)

In the shift register 30, the value of the mantissa part of each of the inputted floating point data is shifted, based on the quantity of shift calculated by the equation (3) (step S4).

$$\text{Fixed point data}=D_{inM}/2^{(quantity\ of\ shift)} \quad (4)$$

($D_{inM}$: mantissa value of the inputted floating point data)

Then, in the bit extracting portion 40, a predetermined number of bits are extracted from the mantissa part which is shifted in the shift register 30 as the fixed point data to be inputted to the Viterbi decoding circuit (step S5). In this case, by fixing the location of bits to be extracted to bit location having high decoding rate, it is possible to improve the precision of decoding.

In the bit extracting portion 40, when an overflow occurs in the extracted bits, saturation processing is performed by representing the maximum value by using the extracted bits (step S6), and thereby optimization of data is attained.

Thereafter, the fixed point data extracted in the bit extracting portion 40 is inputted to the Viterbi decoding circuit (step S7), and, in the Viterbi decoding circuit, Viterbi decoding is performed by using the inputted fixed point data (step S8).

Hereafter, an explanation will be made on the above-mentioned series of processings, by way of example when four (4) bit data is supplied to the Viterbi decoding circuit.

The inputted data is assumed to be as follows. That is, a mantissa part (including a sign bit) is 8 bits in length, an exponent part is 4 bits in length, and the output is 4 bits. Also, it is assumed that the following three floating point data are inputted.

Mantissa Part|Exponent Part
1: 0110 0100|0100=100×2$^4$=1600
2: 0110 0000|0110=96×2$^6$=6144
3: 0110 1000|0101=104×2$^5$=3328

First, in the MAX value detecting circuit 10, the maximum floating point data is detected among the inputted floating point data. Here, the maximum floating point data among the three floating point data mentioned above becomes data #2, and, therefore, floating point data #2 is detected as the maximum data.

Next, in the exponent part subtractor 20, in order to adjust the exponent parts of all the inputted floating point data to the same value, the values of the exponent parts of the inputted floating point data are subtracted from the value of the exponent part of the maximum floating point data #2. In the above-mentioned three floating point data, such subtraction becomes as follows.

2-#1=0110-0100=0010

2-#3=0110-0101=0001

In the shift register 30, based on the above-mentioned subtraction result, the mantissa parts of the floating point data #1 and #3 are shifted, and, thereby, each of the floating point data #1 and #3 is represented by using the same exponent as that of the floating point data #2.

That is, according to the result of the following calculation:

2-#1=0110-0100=0010, the value of the mantissa part of the floating point data #1 is shifted by 2 bits. Also, according to the result of the following calculation:

2-#3=0110-0101=0001, the value of the mantissa part of the floating point data #3 is shifted by 1 bit.

Thereby, the following result is obtained.

Mantissa Part|Exponent Part
1: 0001 1001|0110=25×2$^6$=1600
  (mantissa part: shifted by 2 bits)
2: 0110 0000|0110=96×2$^6$=6144
3: 0011 0100|0110=52×2$^6$=3328
  (mantissa part: shifted by 1 bit)

Thereafter, in the bit extracting portion 40, for each of the floating point data #1 to #3, a predetermined number of output bits are extracted from the MSB bit side, and extracted bits are used as the input data to the Viterbi decoding circuit.

Mantissa Part|Viterbi Input Data (4 bits)
1: 0001 1001|to 0001
2: 0110 0000|to 0110
3: 0011 0100|to 0011

The above-mentioned series of processings can be realized by using a subtractor having a bit length of bits of an exponent part, a comparator and a shift register.

Also, by making lower bits other than the bits extracted by the bit extracting portion 40 effective, it is possible to improve precision of Viterbi decoding.

An explanation will be made below on bit extraction processing in the bit extracting portion 40 which improves the precision of Viterbi decoding.

In the bit extraction processing, it is possible to change the location of data bits to be extracted in the bit extracting portion 40 in order to make the lower bit or bits effective, and thereby to improve the precision of Viterbi decoding.

An explanation of the bit extraction processing will be described by way of concrete example.

In the above-mentioned data:

Mantissa Part|Exponent Part
1: 0001 1001|0110=25×2⁶=1600
(mantissa part: shifted by 2 bits)
2: 0110 0000|0110=96×2⁶=6144
3: 0011 0100|0110=52×2⁶=3328
(mantissa part: shifted by 1 bit), the bits to be extracted by the bit extracting portion 40 are determined to be bits whose leading bit is the second bit from the MSB (except the sign bit), and the following result is obtained.

Mantissa Part|Viterbi Input Data (4 Bits)
1: 0001 1001|to 0011
2: 0110 0000|to 0100
3: 0011 0100|to 0110

Here, since there is an overflow in #2, that is, since the MSB bit (except the sign bit) is "1", the maximum value is represented within the bits of the data #2 to perform a saturation processing.

Mantissa Part|Viterbi Input Data (4 Bits)
1: 0001 1001|to 0011
2: 0110 0000|to 0111 (saturation processing)
3: 0011 0100|to 0110

When determining the bits to be extracted in the bit extracting portion 40, it is preferable to set the bit location to be extracted by using a parameter showing the bit location, and to determine the parameter corresponding to a high Viterbi decoding rate as a fixed value.

Figure 3:
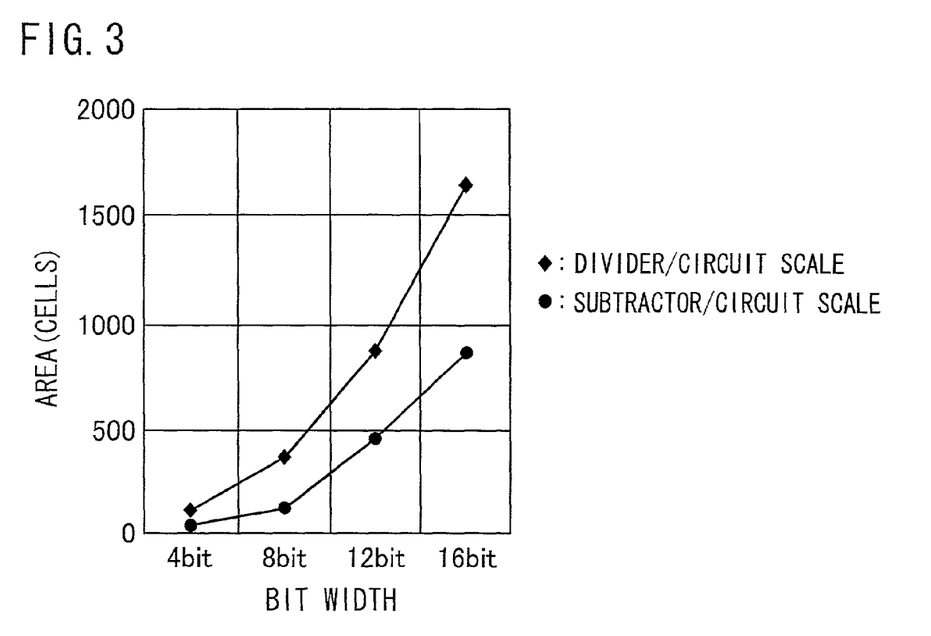
FIG. 3 is a graph showing circuit scales of a fixed point data generating circuit which uses a subtractor and of a fixed point data generating circuit which uses a dividing circuit.

FIG. 3 is a graph showing a circuit scale of each of a fixed point data generating circuit which uses a subtractor and a fixed point data generating circuit which uses a dividing circuit.

As shown in FIG. 3, when compared with the circuit area, i.e., number of circuit cells, of the fixed point data generating circuit which uses a dividing circuit, the circuit area, i.e., number of circuit cells, of the fixed point data generating circuit shown in FIG. 1 which uses a subtractor can be reduced.

Figure 4:
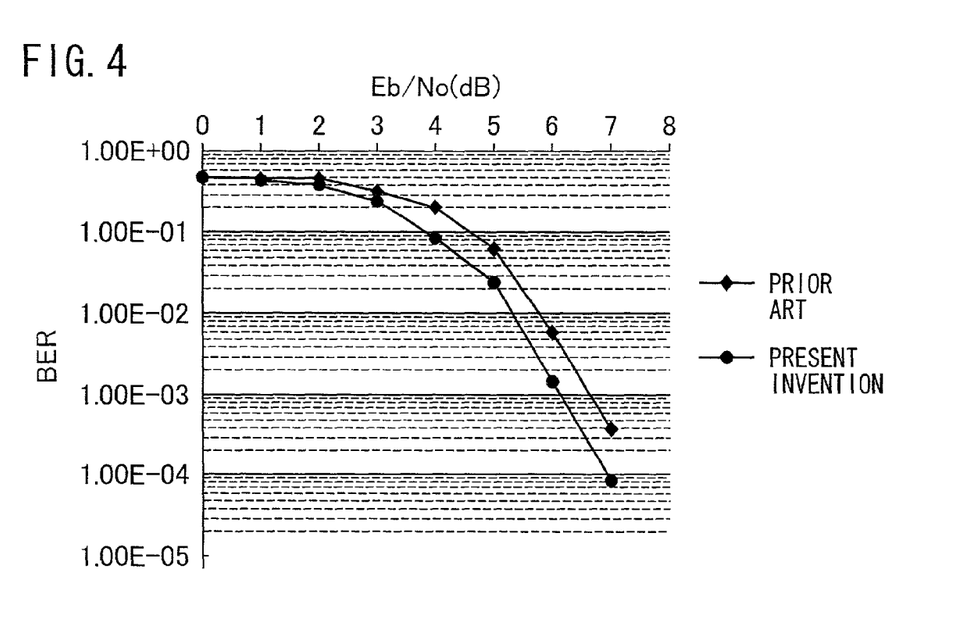
FIG. 4 is a graph showing bit error rate (BER) characteristic of each of the fixed point data generating circuit shown in FIG. 1 and a conventional fixed point data generating circuit.

FIG. 4 is a graph showing bit error rate (BER) characteristic of each of the fixed point data generating circuit shown in FIG. 1 and the conventional fixed point data generating circuit. FIG. 4 shows decoding rates of respective values of Eb/No (energy versus noise power density per one bit).

In FIG. 4, it is assumed that equal floating point data is inputted to the conventional fixed point data generating circuit and to the fixed point data generating circuit shown in FIG. 1, and that number of input bits to the Viterbi decoding circuit is 8 bits. In this condition, when BER values corresponding to a value of Eb/No are roughly compared, in the proximity of Eb/No=6 dB, BER=1.00E-02 in the conventional fixed point data generating circuit (it is impossible to decode one data per 100 number of data). On the other hand, in the fixed point data generating circuit of FIG. 1, BER=1.00E-03 (it is impossible to decode one data per 1000 number of data), and it can be seen that the decoding rate is improved.

Second Embodiment

Figure 5:
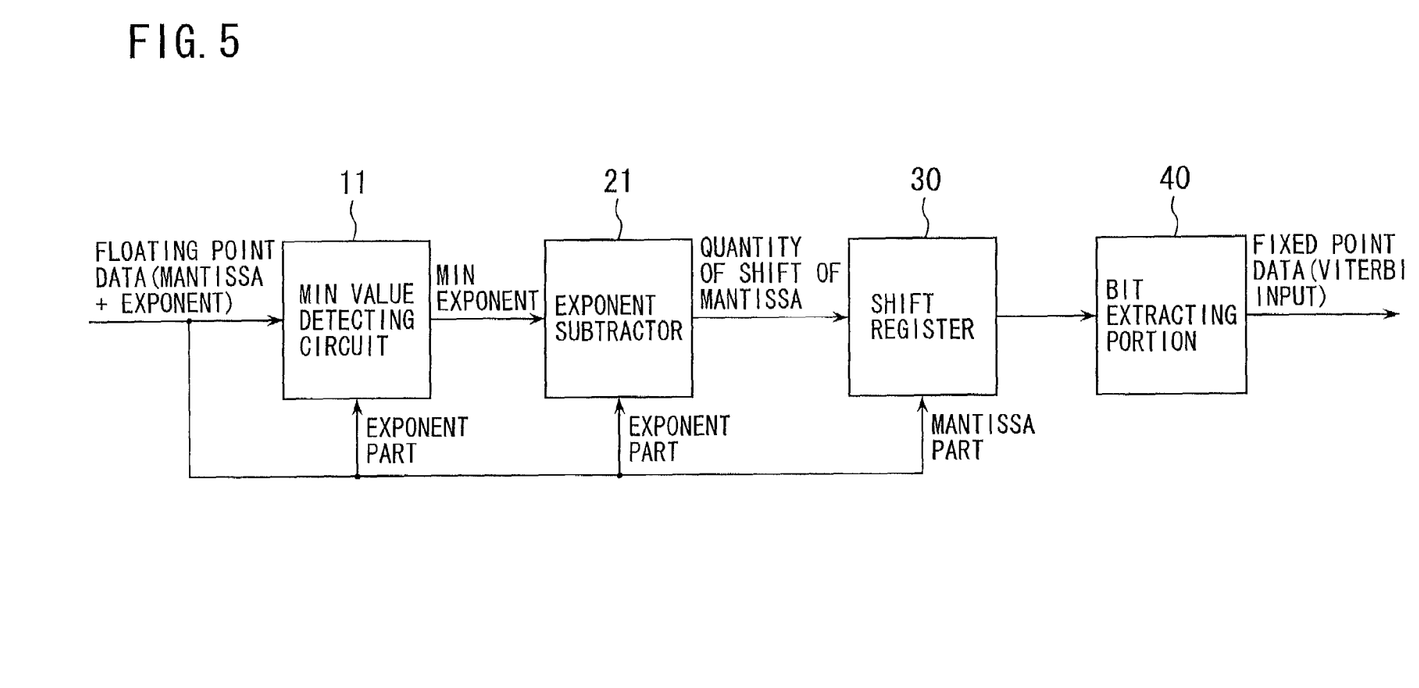
FIG. 5 is a schematic block diagram showing a fixed point data generating circuit according a second embodiment of the present invention.

FIG. 5 is a schematic block diagram showing a second embodiment of a fixed point data generating circuit according to the present invention.

As shown in FIG. 5, the fixed point data generating circuit according to the second embodiment of the present invention comprises: a MIN (i.e., minimum) value detecting circuit 11 which detects the minimum floating point data among inputted floating point data which are inputted to the MIN value detecting circuit 11; an exponent part subtractor 21 which subtracts the value of an exponent part of the floating point data which is detected as the minimum value at the MIN value detecting circuit 11 from the value of an exponent part of each of the inputted floating point data; a shift register 30 which shifts the value of a mantissa part of each of the inputted floating point data based on the result of subtraction at the exponent part subtractor 21; and a bit extracting portion 40 which extracts, from the mantissa part shifted by the shift register 30, a predetermined number of bits as the fixed point data to be inputted to a Viterbi decoding circuit (not shown in the drawing).

With reference to a flow chart, an explanation will be made on a method of generating the fixed point data in the fixed point data generating circuit which is constituted as mentioned above.

Figure 6:
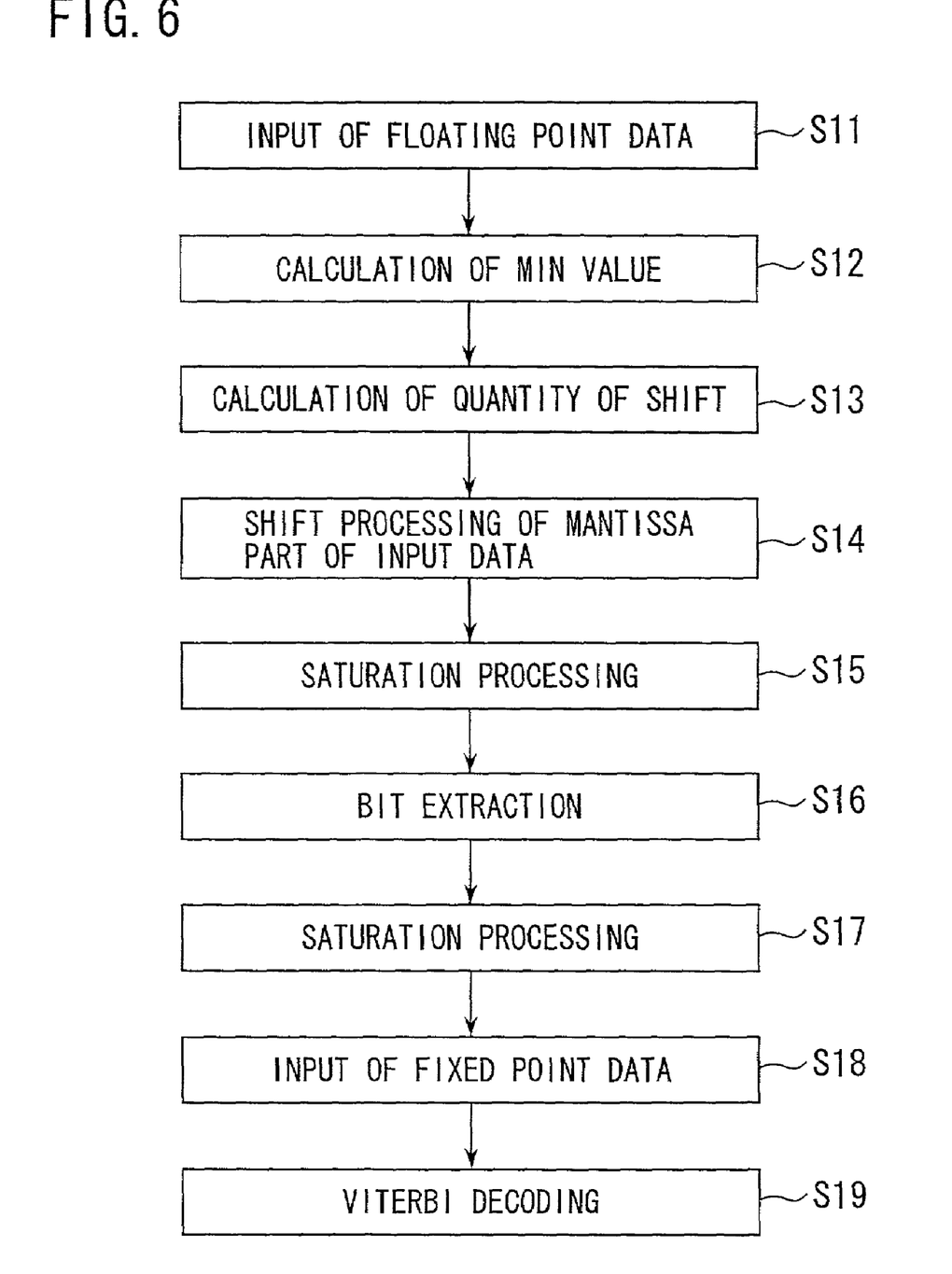
FIG. 6 is a flow chart used for explaining a method of generating fixed point data from floating point data in the fixed point data generating circuit shown in FIG. 5.

FIG. 6 is the flow chart used for explaining the method of generating the fixed point data in the fixed point data generating circuit shown in FIG. 5.

A plurality of floating point data are inputted to the circuit of FIG. 5 (step S11), and, first, in the MIN value detecting circuit 11, the minimum floating point data $D_{min}$ is detected among the inputted floating point data D1, D2, D3, . . . , Dn (step S12).

$$D_{min} = \min\{D1, D2, D3, \ldots, Dn\} \text{ (n: amount of data)} \quad (5)$$

$$(D_{min} = D_{minM(mantissa)} \times 2^{D_{minE}(exponent)})$$

Next, in order to adjust the exponent part of each of the inputted floating point data to the minimum value, the value of the exponent part of the floating point data detected as the minimum value at the MIN value detecting circuit 11 is subtracted from the value of the exponent part of each of the inputted floating point data, at the exponent part subtractor 21, and outputted as a quantity of shift (step S13).

$$\text{Quantity of shift} = D_{inE} - D_{minE} \quad (6)$$

($D_{minE}$: minimum exponent value, $D_{inE}$: exponent value of inputted floating point data)

In the shift register 30, the value of the mantissa part of each of the inputted floating point data is shifted, based on the quantity of shift calculated by the equation (6) (step S14).

$$\text{Fixed point data} = D_{inM}/2^{(quantity\ of\ shift)} \quad (7)$$

($D_{inM}$: mantissa value of the inputted floating point data)

Here, when an overflow occurs in the shifted bits, the maximum value is represented within the bits to perform a saturation processing (step S15).

Then, in the bit extracting portion 40, a predetermined number of bits are extracted from the mantissa part which is shifted in the shift register 30 as the fixed point data to be inputted to the Viterbi decoding circuit (step S16). In this case, by fixing the location of bits to be extracted to bit location having a high decoding rate, it is possible to improve the precision of decoding.

In the bit extracting portion 40, when an overflow occurs in the extracted bits, saturation processing is performed by representing the maximum value by using the extracted bits (step S17), and thereby optimization of data is attained.

Thereafter, the fixed point data extracted in the bit extracting portion 40 is inputted to the Viterbi decoding circuit (step S18), and, in the Viterbi decoding circuit, Viterbi decoding is performed by using the inputted fixed point data (step S19).

Third Embodiment

Figure 7:
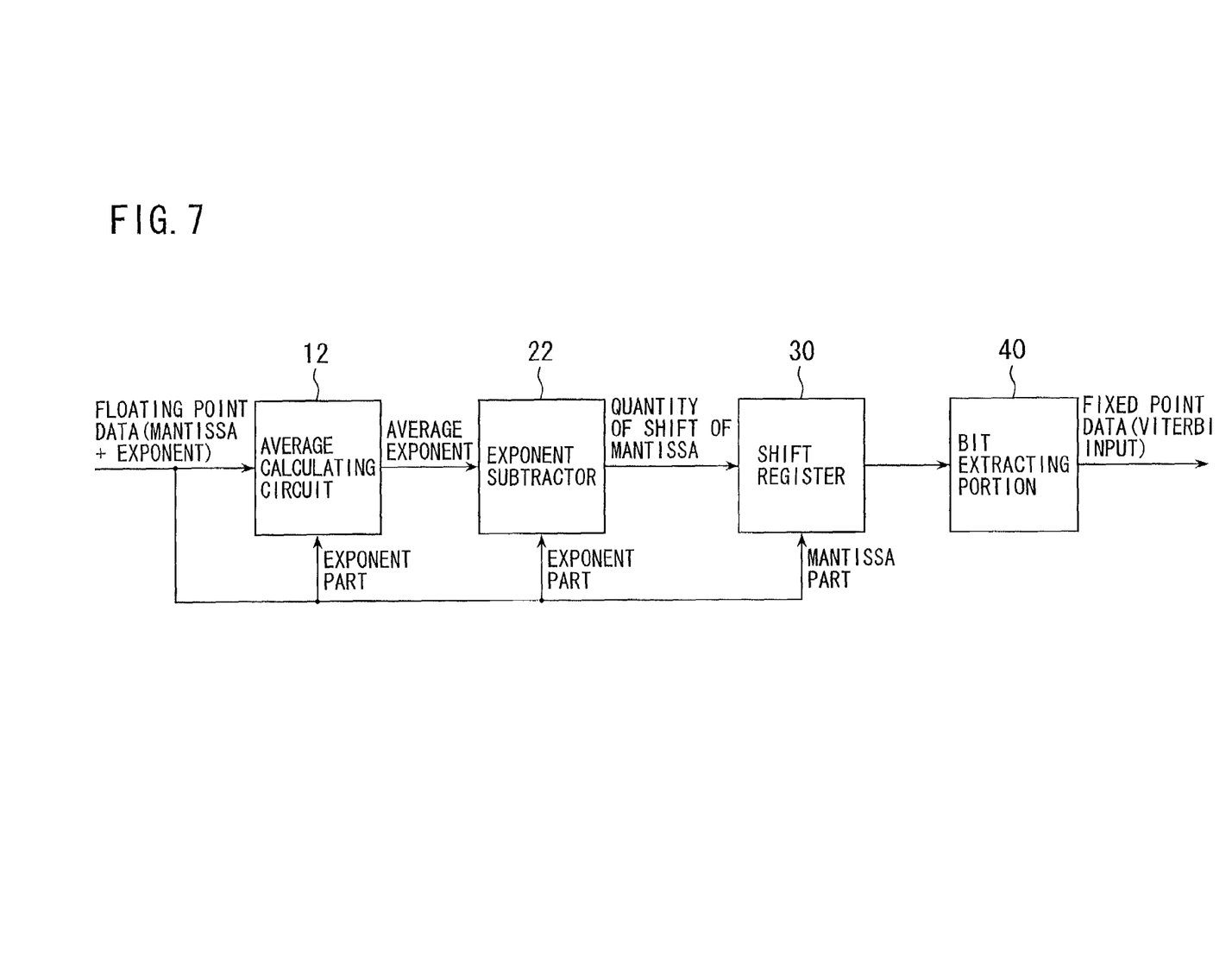
FIG. 7 is a schematic block diagram showing a fixed point data generating circuit according to a third embodiment of the present invention.

FIG. 7 is a schematic block diagram showing a third embodiment of a fixed point data generating circuit according to the present invention.

As shown in FIG. 7, the fixed point data generating circuit according to the third embodiment of the present invention comprises: an average value calculating circuit 12 which calculates an average value of inputted floating point data which are inputted to the average value calculating circuit 12; an exponent part subtractor 22 which obtains a difference between each value of an exponent part of the inputted floating point data and the value of the average value calculated by the average value detecting circuit 12; a shift register 30 which shifts the value of a mantissa part of the inputted floating point data based on the difference obtained in the exponent part subtractor 22; and a bit extracting portion 40 which extracts, from the mantissa part shifted by the shift register 30, a predetermined number of bits as the fixed point data to be inputted to a Viterbi decoding circuit (not shown in the drawing).

With reference to a flow chart, an explanation will be made on a method of generating the fixed point data in the fixed point data generating circuit which is constituted as mentioned above.

Figure 8:
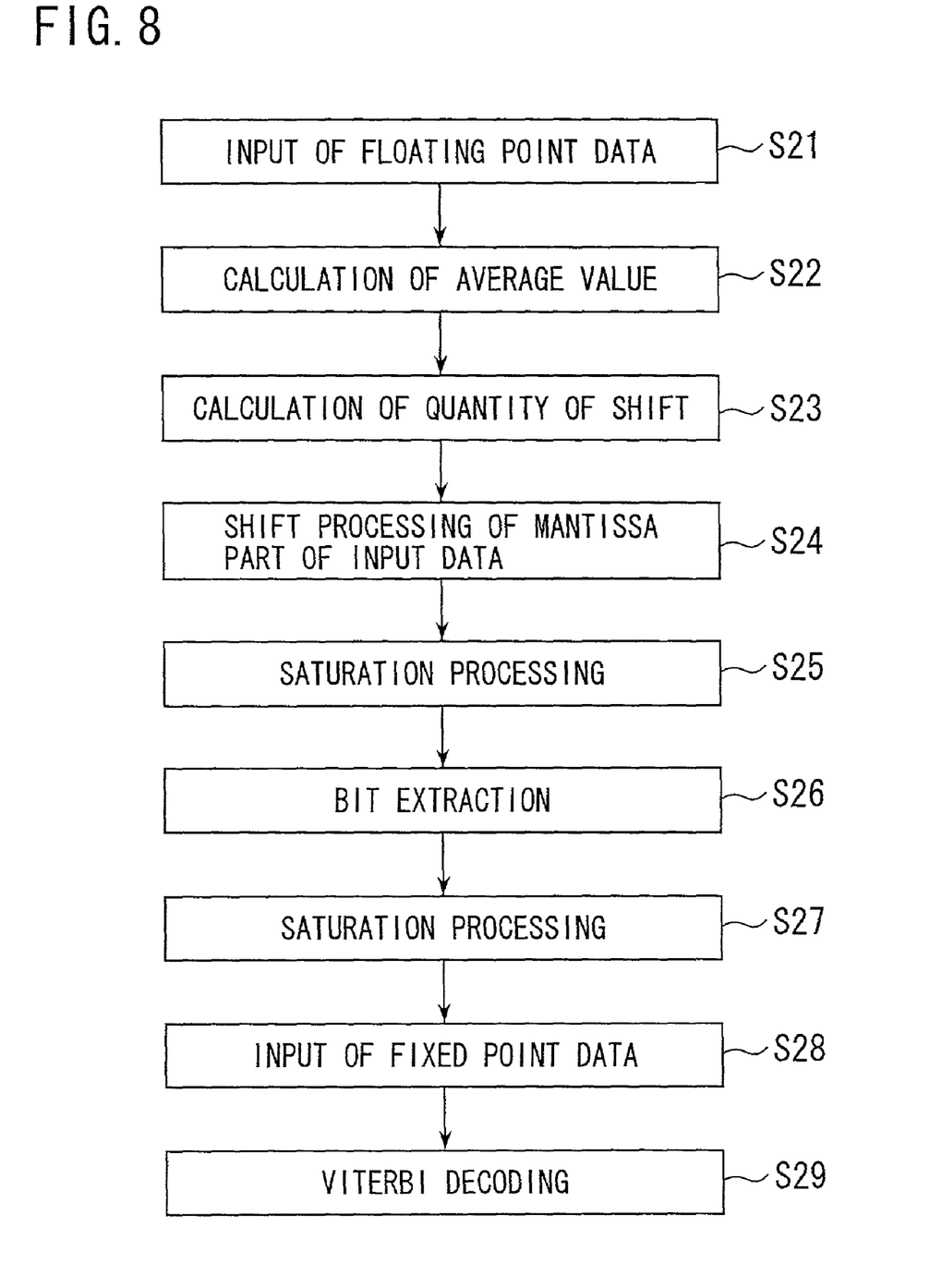
FIG. 8 is a flow chart used for explaining a method of generating fixed point data in the fixed point data generating circuit shown in FIG. 7.

FIG. 8 is the flow chart used for explaining the method of generating the fixed point data in the fixed point data generating circuit shown in FIG. 7.

A plurality of floating point data are inputted to the circuit of FIG. 7 (step S21), and, first, in the average value calculating circuit 12, the average value $D_{ave}$ of the inputted floating point data D1, D2, D3, ..., Dn is calculated (step S22).

$$D_{ave} = \text{average}\{D1, D2, D3, \ldots, Dn\} \text{ (n: amount of data)} \quad (8)$$

$$(D_{ave} = D_{aveM(mantissa)} \times 2^{DaveE(exponent)})$$

Next, in order to adjust the exponent parts of the inputted floating point data to the exponent value of the average value, a difference is obtained between the value of the exponent part of each of the inputted floating point data and the exponent part of the average value calculated in the average value detecting circuit 12, at the exponent part subtractor 22, and outputted as a quantity of shift (step S23).

$$\text{Quantity of shift} = D_{aveE} - D_{inE} \quad (9)$$

($D_{aveE}$: average exponent value, $D_{inE}$: exponent value of inputted floating point data)

In the shift register 30, the value of the mantissa part of each of the inputted floating point data is shifted, based on the quantity of shift calculated by the equation (9) (step S24). Here, when the quantity of shift is calculated by using the average value of the floating point data like the present embodiment, there is a possibility that the value of the mantissa part shifts in either of the MSB bit side and the LSB bit side. Therefore, concerning an operation of the shift register 30 when the fixed point data is calculated, the following two formulas become true.

(exponent value of average data>exponent value of inputted floating point data)

$$\text{Fixed point data} = D_{inM}/2^{(quantity\ of\ shift)} \quad (10)$$

($D_{inM}$: mantissa value of the inputted floating point data)
(exponent value of average data<exponent value of inputted floating point data)

$$\text{Fixed point data} = D_{inM} \times 2^{(quantity\ of\ shift)} \quad (11)$$

($D_{inM}$: mantissa value of the inputted floating point data)

Also, when an overflow occurs in the shifted bits, the maximum value is represented within the bits to perform a saturation processing (step S25).

Then, in the bit extracting portion 40, a predetermined number of bits are extracted from the mantissa part which is shifted in the shift register 30 as the fixed point data to be inputted to the Viterbi decoding circuit (step S26). In this case, by fixing the location of bits to be extracted to bit location having a high decoding rate, it is possible to improve the precision of decoding.

In the bit extracting portion 40, when an overflow occurs in the extracted bits, saturation processing is performed by representing the maximum value by using the extracted bits (step S27), and thereby optimization of data is attained.

Thereafter, the fixed point data extracted in the bit extracting portion 40 is inputted to the Viterbi decoding circuit (step S28), and, in the Viterbi decoding circuit, Viterbi decoding is performed by using the inputted fixed point data (step S29).

(Effect of the Invention)

As mentioned above, in the present invention, a reference floating point data which has the maximum or minimum value is detected among the inputted plurality of floating point data, and differences are obtained between the values of the exponent parts of a plurality of inputted floating point data and the exponent value of the maximum or minimum floating point data. Thereafter, the mantissa parts of the inputted floating point data are shifted by the differences, and a predetermined number of bits of the shifted mantissa parts are extracted as the fixed point data. Therefore, it is possible to produce the fixed point data only by the comparison and subtraction of the inputted floating point data, so that it becomes possible to perform optimization with respect to the inputted floating point data and to reduce a circuit scale.

Also, in case an average value of inputted plurality of floating point data is calculated and differences are obtained between the value of an exponent part of the average value and the values of exponent parts of the inputted plurality of floating point data, effects similar to those mentioned above can be obtained.

Further, in case location of bits extracted as the fixed point data is previously determined to be location having a high decoding rate, it is possible to improve the decoding rate.

In the foregoing specification, the invention has been described with reference to specific embodiments. However, one of ordinary skill in the art appreciates that various modifications and changes can be made without departing from the scope of the present invention as set forth in the claims below. For example, in the above-mentioned embodiments, the maximum, minimum or average data are obtained from the inputted floating point data and used as a reference data. However, it is also possible to use any other data obtained from the inputted floating point data as a reference data. For example, it is possible to use the median obtained from the inputted floating point data as the reference data, in place of the maximum, minimum or average data.

Accordingly, the specification and figures are to be regarded in an illustrative sense rather than a restrictive sense, and all such modifications are to be included within the scope of the present invention. Therefore, it is intended that this invention encompasses all of the variations and modifications as fall within the scope of the appended claims.

What is claimed is:

1. A fixed point data generating circuit which receives a plurality of floating point data and converts said received plurality of floating point data into respective fixed point data, said fixed point data generating circuit comprising:
a reference data determining unit for determining a reference floating point data from said received plurality of floating point data;
an exponent part subtractor unit for obtaining the differences between the values of the exponent parts of the received floating point data which are not determined as said reference floating point data and a value of an exponent part of said reference floating point data;
a shifting unit for shifting a mantissa part of each of said plurality of floating point data by the difference obtained for the corresponding floating point data; and
a bit extracting unit for extracting a predetermined number of bits of each shifted mantissa part as fixed point data, a leading bit of said predetermined number of bits comprising a second bit from the most significant bit (MSB) of the shifted mantissa part except the sign bit,
wherein when an overflow occurs in said extracted bits, said bit extracting unit outputs a predetermined maximum value of said fixed point data.

2. A fixed point data generating circuit as set forth in claim 1, wherein said reference data determining unit comprises a maximum value detecting circuit which detects the maximum value from among the values of said plurality of floating point data, and said reference floating point data is the data having the detected maximum value.

3. A fixed point data generating circuit as set forth in claim 1, wherein said reference data determining unit comprises a minimum value detecting circuit which detects the minimum value from among the values of said plurality of floating point data, and said reference floating point data is the data having the detected minimum value.

4. A fixed point data generating circuit as set forth in claim 1, wherein said reference data determining unit comprises an average value calculating circuit which calculates an average value of the values of said floating point data, and said reference floating point data is data having the average value.

5. A computer-implemented method for performing Viterbi decoding utilizing fixed point data obtained by converting a plurality of inputted floating point data into respective fixed point data, said computer-implemented method comprising:
determining a reference floating point data from said plurality of inputted floating point data;
obtaining the differences between the values of the exponent parts of the inputted floating point data which are not determined as said reference floating point data and a value of an exponent part of said reference floating point data;
shifting a mantissa part of each of said plurality of floating point data by the difference obtained for the corresponding floating point data;
extracting a predetermined number of bits of each shifted mantissa part as fixed point data, a leading bit of said predetermined number of bits comprising a second bit from the most significant bit (MSB) of the shifted matissa part except the sign bit; and
inputting said fixed point data to a Viterbi decoder to perform Viterbi decoding with the fixed point data,
wherein in extracting the predetermined number of bits, when an overflow occurs in said extracted bits, a predetermined maximum value of said fixed point data is output.

6. A method for generating fixed point data as set forth in claim 5, wherein said reference floating point data is the maximum data among said plurality of floating point data.

7. A method for generating fixed point data as set forth in claim 5, wherein said reference floating point data is the minimum data among said plurality of floating point data.

8. A method for generating fixed point data as set forth in claim 5, wherein said reference floating point data is the average data of said plurality of floating point data.

9. A method for generating fixed point data as set forth in claim 5, further comprising utilizing the fixed point data.

10. A method for generating fixed point data as set forth in claim 9, wherein the fixed point data is utilized in a Code Division Multiple Access system.

11. A Viterbi decoding method, comprising:
receiving a first floating point data;
shifting a mantissa part of said first floating point data;
extracting a predetermined number of bits of said shifted mantissa part as a fixed point data, said fixed point data being utilized in a Viterbi decoding, a leading bit of said extracted bits comprising a second bit from the most significant bit (MSB) of the shifted matissa part except the sign bit;
saturating said fixed point data when, in said mantissa of said first floating point data, a more significant bit than said part extracted as said fixed point data is 1; and
inputting said fixed point data to a Viterbi decoder to perform a Viterbi decoding by utilizing said fixed point data,
wherein in said extracting said predetermined number of bits, when an overflow occurs in said extracted bits, a predetermined maximum value of said fixed point data is output.

12. The Viterbi decoding method according to claim 11, wherein said saturating said fixed point data comprises saturating said fixed point data except a sign bit.

13. The Viterbi decoding method according to claim 12, wherein said sign bit comprises a most significant bit of said fixed point data.

14. The Viterbi decoding method according to claim 11, wherein a location, in said mantissa of said first floating point data, of said part extracted as said fixed data is determined to improve a decoding rate of said Viterbi decoding.

15. The Viterbi decoding method according to claim 12, further comprising:
receiving a plurality of floating point data;
determining a reference floating point data from said plurality of received floating point data;
obtaining a difference between values of exponent pans of the received floating point data which are not determined as said reference floating point data and a value of an exponent part of said reference floating point data; and
shifting a mantissa part of each of said plurality of floating point data by the difference obtained for the corresponding floating point data in order to generate said first floating point data.

16. The Viterbi decoding method according to claim 15, wherein said reference floating point data comprises a maximum value among said plurality of floating point data.

17. The Viterbi decoding method according to claim 15, wherein said reference floating point data comprises a minimum value among said plurality of floating point data.

18. The Viterbi decoding method according to claim 15, wherein said reference floating point data comprises an average value of said plurality of floating point data.

* * * * *